United States Patent [19]

Nishizawa et al.

[11] 4,447,589

[45] May 8, 1984

[54] METHOD FOR PREPARING POLYAMIDE-IMIDE RESIN

[75] Inventors: Hiroshi Nishizawa, Kitaibaraki; Yoshiyuki Mukoyama; Shozo Kasai, both of Hitachi, all of Japan

[73] Assignee: Hitachi Chemical Co., Ltd., Tokyo, Japan

[21] Appl. No.: 439,198

[22] Filed: Nov. 4, 1982

[30] Foreign Application Priority Data

May 28, 1982 [JP] Japan .................................. 57-91768

[51] Int. Cl.³ ............................................. C08G 18/80
[52] U.S. Cl. ...................................... 528/45; 528/49; 528/52; 528/53; 528/73
[58] Field of Search ........................ 528/45, 49, 52, 53, 528/73

[56]  References Cited

U.S. PATENT DOCUMENTS 4,076,694  2/1978  Zecher et al. ......................... 528/45

Primary Examiner—Maurice J. Welsh
Attorney, Agent, or Firm—Antonelli, Terry & Wands

[57]  ABSTRACT

A polyamide-imide resin which can give a varnish having a high resin content, excellent in storage stability and heat resistant final products can be produced by reacting an aromatic diisocyanate with a tricarboxylic acid anhydride in the presence of a basic solvent while adjusting the resin content at 40% by weight or more, and adding a specific amount of lactam and a specific amount of an alcohol and/or an oxime separately before, during or after the above-mentioned reaction so as to adjust the reduced viscosity of the resin to 0.10 to 0.27.

18 Claims, No Drawings

METHOD FOR PREPARING POLYAMIDE-IMIDE RESIN

BACKGROUND OF THE INVENTION

This invention relates to a process for producing a polyamide-imide resin which can give a varnish having a high resin content, excellent in storage stability and is useful particularly as a varnish for heat-resistant electric wire.

In the prior art, as polyamide-imide resins used in varnishes for heat-resistant electric wire, there have heretofore been used those which are obtained by using N-methylpyrrolidone (NMP) as a solvent for synthesis, have a reduced viscosity (concentration: 0.5 g/dl, solvent: dimethylformamide, measurement temperature: 30° C.) of more than 0.4 and have a sufficiently increased molecular weight. On the other hand, since the solution viscosities of varnishes for electric wire are set at about 30 poises (30° C.) in the case of die coating because of restriction as to coating workability, the resin content of the above-mentioned polyamide-imide resins with a high molecular weight satisfying this requirement has an upper limit of about 30% by weight even if a good solvent NMP is used. Therefore, when such polyamide-imide resins with a high molecular weight are used in varnishes for electric wire, a large amount of expensive NMP must be used, and this poses a problem from the viewpoint of the cost.

One method for reducing the cost by decreasing the used amount of NMP and increasing the resin content is to lower the molecular weight of the resin. However, when the molecular weight of a polyamide-imide resin obtained from a diisocyanate and a tricarboxylic acid anhydride is lowered so that the reduced viscosity of the resin may be 0.4 or lower, the terminal functional group concentration of the resin increases, so that the viscosity of the resulting varnish increases gradually with the lapse of time, which results in causing a problem of marked lowering of the storage stability. In the case where the viscosity has increased as days go by, when the resin is used, for example, as a varnish for electric wire, there are caused inconveniences such as the alteration of initially set coating conditions and the adjustment of the viscosity by diluting the varnish having an increased viscosity with a solvent, and the characteristics of a protective coating film formed by volatilizing the solvent sometimes vary.

There is also a proposal aiming at removing these disadvantages, on a process for producing a stabilized polyamide-imide resin capable of having a high resin content in which terminal functional groups are masked with a specific active-hydrogen-containing compound. This process is greatly improved in the storage stability of a polyamide-imide resin having a lowered molecular weight, but is required to employ more strict stabilizing technique for polyamide-imide resins which have a lowered molecular weight for making the reduced viscosity 0.3 or lower and have a greatly increased resin content. That is to say, it is necessary to devise a stabilizing method so that polyamide-imide resins stabilized in such a low molecular weight region may show a sufficient cure reactivity at the time of baking and curing. Particularly when there is used such an active-hydrogen-containing compound wherein the terminal functional groups are masked by thermally irreversible bonding groups in a usual baking temperature range, the resulting resin is greatly lowered in cure reactivity, though it is excellent in storage stability.

SUMMARY OF THE INVENTION

An object of this invention is to provide a process for producing a stabilized polyamide-imide resin which is free from such problems, can have a greatly increased resin content, is excellent in storage stability and cure reactivity, and is useful particularly as a varnish for heat-resistant electric wire.

The present inventors effected resinification reactions under various synthesis conditions, varying the kind of agents for masking the terminal functional groups of the resulting polyamide-imide resin (masking agents), their used amounts, the molecular weight of the resin and the like, and investigated in detail relationships between the resin composition of the resulting resin and its practical performance characteristics to accomplish this invention.

This invention provides a process for producing a polyamide-imide resin by reacting an aromatic diisocyanate (I) and a tricarboxylic acid anhydride (II) in approximately equimolar amounts in the presence of a basic solvent while adjusting the resin content at 40% by weight or more, the improvement wherein a lactam (III) in an amount of 0.1 to 1.0 mole per mole of the aromatic diisocyanate (I), and if necessary, an alcohol (IV) and/or an oxime (V) in an amount of 0.01 to 0.5 mole per mole of the aromatic diisocyanate (I) is added simultaneously or separately before, during or after the above-mentioned reaction so as to make the reduced viscosity of the resin 0.10 to 0.27.

DESCRIPTION OF PREFERRED EMBODIMENTS

The most preferable method for adding masking agents for obtaining excellent practical performance characteristics without damaging the cure reactivity is to add first a lactam before, during or after the reaction to mask terminal functional groups (mainly isocyanate groups) and then to add an alcohol and/or an oxime after the reaction to mask terminal functional groups (mainly acid anhydride groups). From the viewpoint of the cure reactivity of the resulting resin, the isocyanate group is preferably masked by the lactam. But it is possible to react an alcohol and/or an oxime with a tricarboxylic acid anhydride, and then reacting therewith an aromatic diisocyanate, followed by the reaction with a lactam. It is also possible to react an alcohol and/or an oxime with the tricarboxylic acid anhydride, and subsequently add thereto an aromatic diisocyante and a lactam to react at the same time.

According to this invention, there can be obtained a polyamide-imide resin which can give a varnish having a high resin content of about 40-55% by weight, excellent in long-term storage stability, and can be used particularly in varnishes for heat-resistant electric wire.

The aromatic diisocyanate used in this invention includes, for example, tolylene diisocyanate, xylylene diisocyanate, 4,4'-diphenylether diisocyanate, naphthalene-1,5-diisocyanate, 4,4'-diphenylmethane diisocyanate, etc. When the heat resistance and the like are taken into consideration, it is preferable to use 4,4'-diphenylmethane diisocyanate or tolylene diisocyanate. If necessary, there may be co-used aliphatic diisocyanates such as 1,6-hexamethylene diisocyanate, isophorone diisocyanate and the like, alicyclic diisocyanates, trimers thereof, isocyanurate-ring-containing polyisocyanates obtained by trimerization reaction of the aforesaid aromatic diisocyanates, polyphenylmethyl polyisocyanates, e.g., a phosgenated condensate of aniline and formaldehyde, etc. In particular, isocyanurate-ring-containing polyisocyanates obtained by trimerization reaction of tolylene diisocyanate or 4,4'-diphenylmethane diisocyanate which are effective for improving the heat resistance, are preferred, and their used amount is preferably 0.03 to 0.20 equivalent per equivalent of the aromatic diisocyanate when the resulting varnish is used for heat-resistant electric wire.

As the tricarboxylic acid anhydride, there can be used, for example, compounds represented by the general formulas (i) and (ii):

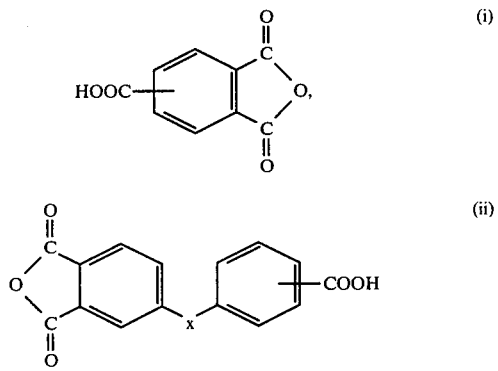

wherein X is —$CH_2$—, —CO—, —$SO_2$—, —O— or the like. When the heat resistance, the cost and the like are taken into consideration, trimellitic acid anhydride is preferred.

If necessary, polycarboxylic acids or acid anhydrides thereof other than the tricarboxylic acid anhydrides described above may also be co-used. As such polycarboxylic acids, there can be used, for example, trimellitic acid, trimesic acid, tris(2-carboxyethyl)isocyanurate, terephthalic acid, isophthalic acid, succinic acid, adipic acid, sebacic acid, dodecanedicarboxylic acid and the like.

As the polycarboxylic acid anhydrides, there can be used dianhydrides of tetrabasic acids, for example, aliphatic and alicyclic tetrabasic acids such as 1,2,3,4-butanetetracarboxylic acid, cyclopentanetetracarboxylic acid, ethylenetetracarboxylic acid, bicyclo-[2,2,2]-octo-(7)-ene-2:3, 5:6-tetracarboxylic acid and the like; aromatic tetrabasic acids such as pyromellitic acid, 3,3',4,4'-benzophenonetetracarboxylic acid, bis(3,4-dicarboxyphenyl) ether, 2,3,6,7-naphthalenetetracarboxylic acid, 1,2,5,6-naphthalenetetracarboxylic acid, ethylene glycol bistrimellitate, 2,2'-bis(3,4-biscarboxyphenyl)-propane, 2,2',3,3'-diphenyltetracarboxylic acid, perylene-3,4,9,10-tetracarboxylic acid, 3,4-dicarboxyphenylsulfonic acid and the like; heterocyclic tetrabasic acids such as thiophene-2,3,4,5-tetracarboxylic acid, pyrazinetetracarboxylic acid and the like; etc.

These polycarboxylic acids or acid anhydrides thereof may be used for improving resin characteristics such as flexibility, solubility in solvents, melt-flow characteristics (processability) in molding and processing, cure reactivity, and the like. In particular, 3,3',4,4'-benzophenonetetracarboxylic acid dianhydride effective for improving the cure reactivity is preferred. The using amount of 3,3',4,4'-benzophenonetetracarboxylic acid dianhydride is preferably in the range of 0.03 to 0.2 mole per mole of the tricarboxylic acid anhydride.

The aromatic diisocyanate and the tricarboxylic acid anhydride are reacted in approximately equimolar amounts. When they are reacted in approximately equimolar amounts, a polyamide-imide resin having a sufficiently high molecular weight is obtained at the time of baking and curing, and shows the best heat resistance and flexibility. Although the diisocyanate compound may be added in slightly excessive amount of moles in consideration of the fact that a small amount of water contained as an impurity in the reaction solvent reacts with isocyanate groups, the amount of the aromatic diisocyanate compound must not be more than 1.1 moles per mole of the tricarboxylic acid anhydride.

As the basic solvent, there can be used those which are substantially inert to the aromatic diisocyanates. For example, N-methylpyrrolidone, dimethylformamide, dimethylacetamide and the like can be used. As a synthesis solvent for the aromatic diisocyanate and the tricarboxylic acid anhydride, N-methylpyrrolidone is preferred. As a dilution solvent used after the reaction, dimethylformamide is preferred. Dimethylformamide has an effect of lowering the solution viscosity of the resulting varnish, and contributes to the increase of the resin content.

As to the resin concentration during the reaction, when the resin content is less than 40% by weight, the excess solvent should be removed after the synthesis by complicated procedures such as condensation or the like, so that an economical disadvantage is brought about. When the cost, the performance characteristics and the like are taken into consideration, the resin content is preferably 40 to 80% by weight. Here, the term "resin content" means the concentration of the sum of the aromatic diisocyanate and the tricarboxylic acid anhydride in the reaction system. However, the amount of the lactam, alcohol and oxime to be used is not included in this calculation.

As the lactam, alcohol and oxime used in this invention as agents for masking the terminal functional groups of the produced polyamide-imide resin (masking agents), there may be used, for example, lactams such as 2-pyrrolidone, ε-caprolactam, lauryllactam and the like; alcohols having 1 to 10 carbon atoms, such as methanol, ethanol, n-butanol, t-butanol, methyl Cellosolve, ethyl Cellosolve, methylcarbitol, benzyl alcohol, cyclohexanol, ω-hydro.perfluoroalcohol and the like; oximes such as 2-butanone oxime, formaldoxime, acetaldoxime, cyclohexanone oxime and the like; etc. These masking agents preferably contain one active hydrogen in the molecule. When masking agents contain two or more active hydrogens, they become chain-elongating agents for the resin, so that the controlling of the molecular weight and the solution viscosity become difficult, and that moreover the heat resistance is sometimes lowered.

From the viewpoint of an effect of stabilizing the viscosity of the produced varnish, the easiness of thermal dissociation, the cost and the like, there can preferably be used ε-caprolactam as the lactam, methanol as the alcohol, and 2-butanone oxime as the oxime.

Although lactams are preferred because they hardly damage cure reactivity, they are sometimes insufficient in an effect of imparting storate stability. This problem tends to be caused particularly when the resin has a low molecular weight and a high terminal functional group concentration. When the storage stability is insufficient as described above, the problem can be solved by using the above-mentioned methanol and/or oxime according to the need.

The using amount of the lactam is 0.1 to 1.0 mole per mole of the aromatic diisocyanate. When it is less than 0.1 mole, the storage stability becomes insufficient. When it exceeds 1.0 mole, there is brought about a relatively slight inhibitory effect on cure reactivity, however a large amount of free lactam remains and hence the resulting varnish has a decreased resin content. When a lactam alone is used as a masking agent, its used amount is preferably in the range of 0.3 to 1.0 mole per mole of the aromatic diisocyanate. When a mixed system of a lactam and an alcohol and/or an oxime is used as masking agent, the using amount of the lactam is preferably in the range of 0.2 to 0.8 mole per mole of the aromatic diisocyanate.

The using amount of the alcohol and/or the oxime is 0.01 to 0.5 mole per mole of the aromatic diisocyanate. When it is less than 0.01 mole, there is brought about only an insufficient effect on the storage stability. When it exceeds 0.5 mole, the cure reactivity is greatly lowered, so that a baked coating film formed by using the resulting varnish is deteriorated in practical performance characteristics. It is particularly preferably in the range of 0.01 to 0.3 mole.

The addition of the lactam and of the alcohol and/or the oxime to be used if necessary is conducted before, during or after the reaction described above. They may be added after the polyamide-imide resin is produced and then diluted with another solvent. They may be added either in full at a time or stepwise. It is preferable to add a part of or the whole of the lactam before or during the reaction from the viewpoint of controlling the polymerization and suppressing the formation of bubbles by rapid decarboxylation. However, the alcohol and/or the oxime are preferably added after the reaction because they sometimes damage the polymerization. When the alcohol and/or the oxime are added and reacted before or during the above-mentioned reaction, it is preferable to use the alcohol/or the oxime in a proportion of 0.25 mole or less per mole of the aromatic diisocyanate. When they are used in a proportion of 0.25 mole or more, they tend to damage polymerization or cure reaction.

When at least one masking agent is added before or during the reaction, it is preferable to conduct the reaction at a temperature of 80° to 200° C. The reaction temperature of 160° C. or lower is preferable in order to suppress side reactions such as network formation. It is most suitable to conduct the reaction at about 130° C. When at least one masking agent is added after the reaction, it is preferable to conduct the reaction at a temperature of 80° to 160° C. The reaction temperature can be made lower and lower when the reaction is effected at higher and higher resin content. For example, when the resin content is 60% by weight, the reaction temperature is most suitably about 110° C.

In a method by which at least one masking agent is added after the reaction, it is necessary to completely mask the terminal functional groups by further effecting the reaction at 0° to 130° C. up to 7–8 hours after the addition. The reaction temperature in this case is most suitably about 90° C.

The polyamide-imide resin in this invention should have a reduced viscosity of 0.10 to 0.27. When the reduced viscosity is lower than 0.10, the storage stability or practical performance characteristics such as heat resistance, flexibility and the like become insufficient. When the reduced viscosity exceeds 0.27, the resin content is lowered so as to make it impossible to achieve the object of this invention. The reduced viscosity can be adjusted by measuring the solution viscosity during the reaction. The reduced viscosity is measured in the following manner. To 1 liter of water is added 15 g of a solution prepared by adding N-methylpyrrolidone to a part of a resin solution obtained by the above-mentioned reaction so as to adjust the concentration to 10% by weight, whereby the resin is precipitated. Subsequently, the precipitate is dried under a vacuum of 0.3 mmHg at 60° C. for 10 hours to obtain a solid resin. The solid resin is made into a dimethylformamide solution having a concentration of 0.5 g/dl, and the viscosity of the thus obtained solution is measured at 30° C. by using a Cannon-Feske viscometer (viscometer number 50).

When the polyamide-imide resin obtained in this invention is made into a varnish, there may be used, as co-solvents, xylene, NISSEKI HISOL-100, 150 (trade names, mfd. by Nippon Petrochemicals Co., Ltd., aromatic hydrocarbons obtained from petroleum, b.p. 80°–300° C.), methyl Cellosolve acetate, ethyl Cellosolve acetate, γ-butyrolactone and the like in combination with the basic organic solvents described above.

If necessary, catalysts for promoting cure or catalysts for dissociating urethane may be co-used in the polyamide-imide resin obtained in this invention. There are used, for example, tertiary amines such as triethylamine, triethylenediamine, dimethylaniline, dimethylethanolamine, 1,8-diaza-bicyclo(5,4,0)-undecene-7 (or its organic acid salts), and the like; organotin compounds such as dibutyltin dilaurate, dibutyltin dioctoate and the like; organic titanium compounds such as tetrabutoxytitanate, tetraisopropoxytitanate, chelate or acylate compounds thereof, and the like; trialkylphosphine; etc. In particular, the tertiary amines are preferred. If necessary, various additives such as curing agents, surfactants and the like may be added to the polyamide-imide resin.

As the curing agents, there are used epoxy resins, amino resins, phenol-formaldehyde resins, polyester resins having one or more hydroxyl groups and/or carboxyl groups, adducts of an aromatic polyisocyanate with any of the previously described compounds containing one active hydrogen in the molecule, etc. There are preferably used adducts of any of the previously described aromatic diisocyanates or trimers thereof with a compound having one active hydrogen in the molecule, particularly preferably an ε-caprolactam adduct of 4,4'-diphenylmethane diisocyanate.

As another additive, benzoin is preferably used. Benzoin can improves the smoothness of the resulting coated film.

When used, for example, as a varnish for heat-resistant electric wire for die coating, the thus obtained varnish can have a high resin content of about 40 to 55% by weight when the solution viscosity is set at 25 to 35 poises (30° C.). When used as a varnish for heat-resistant electric wire for felt coating, the obtained varnish can have a high resin content of about 20 to 35% by weight when the solution viscosity is set at 0.6 to 0.8 poise (30° C.). These varnishes are excellent in logn-term storage stability, and the resulting baked coated films fromed by using them are good in heat resistance and flexibility and moreover excellent in Freon resistance and crazing resistance.

Although the polyamide-imide resin obtained in this invention is used mainly as a varnish for heat-resistant electric wire, it is useful for other purposes, for example, heat-resistance sheets, heat-resistant laminate materials, heat-resistant molded articles, heat-resistant adhesives, heat-resistant composite materials with glass fiber or carbon fiber, impregnation for electric insulation, casting varnish, etc.

This invention is explained below referring to Examples and Comparative Examples.

COMPARATIVE EXAMPLE 1

In a 2-liter four-necked flask equipped with a thermometer, a stirrer and an Allihn condenser, 452.5 g of 4,4'-diphenylmethane diisocyanate, 347.5 g of trimellitic acid anhydride and 1485.7 g of N-methylpyrrolidone were placed and reacted with stirring in a nitrogen stream at 100° C. for 1 hour, at 115° C. for 2 hours, and then at 120° C. for 2 hours, and subsequently heated to 135° C. to promote the reaction (the resin content was 35% by weight). The reaction solution was diluted by adding 381 g of xylene. The resin content (calculated value) of the thus obtained varnish of a polyamide-imide resin was 30% by weight, and the initial viscosity (B-type viscometer, 30° C.) was 31 poises. The reduced viscosity (0.5 g/dl, dimethylformamide, 30° C.) of the polyamide-imide resin was 0.42. The varnish underwent no change in viscosity at all even when allowed to stand at 40° C. for 1 month.

COMPARATIVE EXAMPLE 2

In a 2-liter four-necked flask equipped with a thermometer, a stirrer and an Allihn condenser, 452.5 g of 4,4'-diphenylmethane diisocyanate, 347.5 g of trimellitic acid anhydride and 533.3 g of N-methylpyrrolidone were placed and reacted with stirring in a nitrogen stream at 100° C. for 1 hour and then at 115° C. for 2 hours (the resin content was 60% by weight). The reaction solution was diluted by adding 267 g of N-methylpyrrolidone. The resin content (calculated value) of the thus obtained varnish of a polyamide-imide resin was 50% by weight, and the initial viscosity (B-type viscometer, 30° C.) of the varnish was 32 poises. The reduced viscosity (0.5 g/dl, dimethylformamide, 30° C.) of the polyamide-imide resin was 0.15. The varnish had a viscosity of 1,000 poises or higher after being allowed to stand at 23° C. for 10 days, and was thus very low in storage stability.

COMPARATIVE EXAMPLE 3

In a 2-liter four-necked flask equipped with a thermometer, a stirrer and an Allihn condenser, 45.25 g of 4,4'-diphenylmethane diisocyanate, 347.5 g of trimellitic acid anhydride, 145.0 g of $\epsilon$-caprolactam and 533.3 g of N-methylpyrrolidone were placed and reacted with stirring in a nitrogen stream at 90° C. for 1 hour and then at 115° C. for 1 hour, after which the reaction was further proceeded at 135° C. The reaction solution was cooled to 70° C. when the Gardner viscosity at 30° C. became 30 seconds. Thereto was added 20.5 g of methanol, and the resulting solution was allowed to react at said temperature for 1 hour and then at 90° C. for 2 hours. The reduced viscosity of the resulting resin was 0.09 (0.05 g/dl, dimethylformamide, 30° C.). The resin content (calculated value) of the thus obtained varnish of the polyamide-imide resin was 60% by weight. The varnish had an initial viscosity of 42 poises (30° C.), and had a viscosity of 56 poises after being allowed to stand at 40° C. for 1 month.

EXAMPLE 1

Immediately after the synthesis of the polyamide-imide resin varnish (resin content: 50% by weight) obtained in Comparative Example 2, 96.7 g of $\epsilon$-caprolactam (0.473 mole per mole of the aromatic diisocyanate) was added, and the resulting solution was allowed to react at 110° C. for 3 hours. The solution was then cooled to 60° C., and 37.4 g of 2-butanone oxime (0.237 mole per mole of the aromatic diisocyanate) was added thereto, after which the thus obtained solution was allowed to react at said temperature for 1 hour and then at 90° C. for 3 hours. The resulting resin had a reduced viscosity of 0.15 (0.5 g/dl, dimethylformamide, 30° C.). The thus obtained varnish had an initial viscosity of 33 poises, and had a viscosity of 34.5 poises after being allowed to stand at 40° C. for 1 month: it thus showed excellent storage stability. Both of films obtained by applying this varnish to each glass plate and baking it at 200° C. for 30 minutes or at 250° C. for 30 minutes, respectively, had such excellent flexibility that they were not broken even when wrinkled several times.

EXAMPLE 2

In a 2-liter four-necked flask quipped with a thermometer, a stirrer and an Allihn condenser, 452.5 g of 4,4'-diphenylmethane diisocyanate, 347.5 g of trimellitic acid anhydride, 96.7 g of $\epsilon$-caprolactam and 533.3 g of N-methylpyrrolidone were placed and reacted with stirring in a nitrogen stream at 100° C. for 1 hour, at 115° C. for 2 hours and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 40% by weight, became 25 seconds. Thereafter, the reaction solution was diluted by adding 272.4 g of N-methylpyrrolidone, 345.3 g of dimethylformamide and 2.7 g of methanol. Subsequently, the resulting solution was allowed to react at 90° C. for 3 hours. The reduced viscosity of the resulting resin was 0.24 (0.5 g/dl, dimethylformamide, 30° C.). The resin content (calculated value) of the thus obtained varnish of the polyamide-imide resin was 41% by weight. The varnish had an initial viscosity of 28 poises (30° C.), and had a viscosity of 29 poises (30° C.) after being allowed to stand at 40° C. for 1 month; it thus showed excellent storage stability.

EXAMPLE 3

In a 2-liter four-necked flask equipped with a thermometer, a stirrer and an Allihn condenser, 456.4 g of 4,4'-diphenylmethane diisocyanate, 343.6 g of trimellitic acid anhydride, 533.3 g of N-methylpyrrolidone and 48.4 g of $\epsilon$-caprolactam were placed and reacted with stirring in a nitrogen stream at 100° C. for 1 hour, at 115° C. for 2 hours, and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 44% by weight, became 29 seconds. Thereafter, the reaction solution was diluted by adding 484.9 g of dimethylformamide and 18.6 g of 2-butanone oxime. Subsequently, the resulting solution was allowed to react at 90° C. for 3 hours. The reduced viscosity of the resulting resin was 0.21 (0.5 g/dl, dimethylformamide, 30° C.). The resin content (calculated value) of the thus obtained varnish of the polyamide-imide resin was 44% by weight. The varnish had an initial viscosity of 34 poises (30° C.), and had a viscosity of 36 poises (30° C.) after being allowed to stand at 40° C. for 1 month; it thus showed excellent storage stability.

EXAMPLE 4

To 1,300 g of the varnish (resin content: 44% by weight) obtained in Example 3 were gradually added 177.7 g of N-methylpyrrolidone and 905.7 g of xylene at 70° C. with stirring to obtain a varnish. The resin content (calculated value) of the obtained varnish was 24% by weight. The varnish had an initial viscosity of 0.68 poise (30° C.), and had a viscosity of 0.72 poise (30° C.) after being allowed to stand at 40° C. for 1 month; it thus showed excellent storage stability.

EXAMPLE 5

In a 2-liter four-necked flask equipped with a thermometer, a stirrer and an Allihn condenser, 452.5 g of trimellitic acid anhydride, 96.7 g of ε-caprolactam and 533.3 g of N-methylpyrrolidone were placed and reacted with stirring in a nitrogen stream at 100° C. for 1 hour, at 115° C. for 2 hours, and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 45% by weight, became 28 seconds. Thereafter, the reaction solution was diluted by adding 444.4 g of dimethylformamide. Thereto was added 13.7 g of methanol, and the resulting solution was allowed to react at 90° C. for 3 hours. The reduced viscosity of the resulting resin was 0.21 (0.5 g/dl, dimethylformamide, 30° C.). The resin content (calculated value) of the thus obtained varnish of the polyamide-imide resin was 45% by weight. The varnish had an initial viscosity of 30 poises (30° C.). The varnish had a viscosity of 30 poises (30° C.) after being allowed to stand at 40° C. for 1 month and thus showed excellent storage stability.

Each of the varnishes obtained in Example 2, 3 and 5 and Comparative Examples 1 and 3 was coated on a copper wire and baked by a conventional method to obtain an enamel wire, and characteristics of the thus obtained enamel wires were evaluated. The result are shown in Table 1.

TABLE 1

| Example No. | Comparative Example 1 | Comparative Example 3 | Example 2 | Example 3 | Example 5 |
|---|---|---|---|---|---|
| Flexibility* (10% elongation) | 1X OK | 4X OK | 1X OK | 1X OK | 1X OK |
| Cut through temperature* (2kg) (°C.) | >400 | 390 | >400 | >400 | >400 |
| Abrasion resistance* (600 g) (times) | 130 | 95 | 130 | 120 | 120 |
| Heat shock* (240° C. - 1 hr) | 1X OK | 4X OK | 1X OK | 1X OK | 1X OK |
| BDP Retention** (260° C.) (%) | >80 | >75 | >80 | >80 | >80 |

Note to Table 1:
Baking conditions:
- Diameter of wire: 1 mm,
- Coating conditions: 8 times by using a die
- Furnace length: 4.5 m
- Furnace temperature: inlet 260° C. middle 360° C. outlet 400° C.
- Linear speed of wire: 10 m/min

*According to JIS C 3003
**After deteriorated with heating for 168 hours, retention rate of breakdown voltage was compared with the initial value.

It is shown that Examples 2, 3 and 5 having individual resin contents of 41 to 45% by weight and individual reduced viscosity of 0.20 to 0.24 stabilized by suitable amounts of the combination of a lactam and an alcohol or of a lactam and an oxime possess greatly improved storage stability, as compared with Comparative Example 2 which was not stabilized and with Comparative Example 3 having a reduced viscosity of 0.09 although stabilized under the same conditions as with Example 5. Further the storage stabilities in Examples 2, 3 and 5 are equal to Comparative Example 1 of the prior art. Moreover, it is shown that the enamel wire performance characteristics of Examples 2, 3 and 5 are excellent and equal to those of Comparative Example 1.

As is clear from the above results, the polyamide-imide resins obtained by the production process of this invention are not only good in storage stability but also excellent in heat resistance, flexibility and abrasion resistance, can be used in various heat-resistant materials including varnishes for heat-resistant electric wire, and hence are industrially very effective.

What is claimed is:

1. A process for producing a polyamide-imide resin which comprises reacting an aromatic diisocyanate with a tricarboxylic acid anhydride in approximately equimolar amounts in the presence of a basic solvent which is inert to the aromatic diisocyanate while adjusting the resin content at 40% by weight or more and adding a lactam containing an active hydrogen on the amide nitrogen in an amount of 0.1 to 1.0 mole per mole of the aromatic diisocyanate to the resulting reaction system before, during or after the reaction to mask terminal isocyanate groups and to make the reduced viscosity of the resin 0.10 to 0.27.

2. A process according to claim 1, wherein after the lactam is added to the reaction system before, during or after the reaction of the aromatic diisocyanate and the tricarboxylic acid anhydride to mask terminal isocyanate groups mainly, another masking agent selected from the group consisting of an alcohol, an oxime and a mixture thereof is added to the reaction system to mask terminal acid anhydride groups mainly.

3. A process according to claim 1, wherein the aromatic diisocyanate is 4,4'-diphenylmethane diisocyanate or tolylene diisocyanate.

4. A process according to claim 1, wherein the tricarboxylic acid anhydride is trimellitic anhydride.

5. A process according to claim 1, wherein the basic solvent is N-methylpyrrolidone or dimethylformamide.

6. A process according to claim 1, wherein the lactam is ε-caprolactam.

7. A process according to claim 2, wherein the alcohol is methanol and the oxime is 2-butanone oxime.

8. A process according to claim 2, wherein the lactam is added to the reaction system before or during the reaction of the aromatic diisocyanate and the tricarboxylic acid anhydride, and the alcohol and/or the oxime is added to the reaction system after the reaction of the aromatic diisocyanate and the tricarboxylic acid anhydride to mask terminal functional groups.

9. A process according to claim 8, wherein the lactam is ε-caprolactam, the alcohol is methanol and the oxime is 2-butanone oxime.

10. A process according to claim 1, wherein another masking agent selected from the group consisting of an alcohol, and oxime and a mixture thereof in amounts of 0.25 mole or less per mole of the aromatic diisocyanate is added to the reaction system before or during the reaction of the aromatic diisocyanate and the tricarboxylic acid anhydride, followed by the addition of the lactam to the reaction system.

11. A process according to claim 1, wherein the basic solvent is selected from the group consisting of N-methylpyrrolidone, dimethylformamide, and dimethylacetamide.

12. A process according to claim 1, wherein a masking agent consisting of said lactam is added to the reaction system.

13. A process according to claim 1, wherein a masking agent consisting of said lactam and an alcohol having one active hydrogen in the molecule is added to the reaction system, said alcohol being added in an amount of 0.01 to 0.5 mole per mole of the aromatic diisocyanate.

14. A process according to claim 1, wherein a masking agent selected from the group consisting of said lactam and an oxime having one active hydrogen in the molecule is added to the reaction system, said oxime being in an amount of 0.01 to 0.5 mole per mole of the aromatic diisocyanate.

15. A process according to claim 1, wherein a masking agent consisting of said lactam and a mixture of an alcohol having one active hydrogen in the molecular and an oxime having one active hydrogen in the molecule is added to the reaction system, said mixture of the oxime and the alcohol being in an amount of 0.01 to 0.5 mole per mole of the aromatic diisocyanate.

16. A process according to claim 1, wherein said polyamide-imide resin consists essentially of the reaction product of said aromatic diisocyanate, said tricarboxylic acid anhydride and said lactam.

17. A process according to claim 2, said polyamide-imide resin consists essentially of the reaction product of said aromatic diisocyanate, said tricarboxylic acid anhydride, said lactam and at least one of said alcohol and said oxime.

18. A process according to claim 11, wherein said aromatic diisocyanate is 4,4'-diphenylmethane or tolylene diisocyanate, the acid anhydride is trimellitic anhydride and the lactam is ε-caprolactam.

* * * * *